(12) United States Patent
Baugh

(10) Patent No.: US 6,974,504 B2
(45) Date of Patent: Dec. 13, 2005

(54) ELECTRICAL PIPELINE REMEDIATION

(76) Inventor: Benton F. Baugh, 14626 Oak Bend, Houston, TX (US) 77079

( * ) Notice: Subject to any disclaimer, the term of this patent is extended or adjusted under 35 U.S.C. 154(b) by 257 days.

(21) Appl. No.: 10/648,478

(22) Filed: Aug. 27, 2003

(65) Prior Publication Data

US 2005/0045210 A1    Mar. 3, 2005

(51) Int. Cl.[7] .............................................. B08B 9/027
(52) U.S. Cl. .................... 134/19; 134/22.1; 134/22.11; 392/478; 392/480; 392/488
(58) Field of Search ........................... 134/8, 19, 22.1, 134/22.11; 392/478, 480, 488

(56) References Cited

U.S. PATENT DOCUMENTS 5,289,561 A * 2/1994 Costa Filho ................ 392/478

* cited by examiner

*Primary Examiner*—Michael Barr
*Assistant Examiner*—Saeed Chaudhry

(57) ABSTRACT

A method of remediating deposits within a pipeline comprising inserting a removable smaller pipe within said pipeline, providing an electrically insulating coating on said smaller pipe, providing a contactor proximate said distal end of said smaller pipe to electrically contact said internal diameter of said pipeline, flowing an electrical current along the wall area of said internal pipe, through said contactor, and along the wall area of said pipeline to generate heat within said smaller pipe to remediate blockages within said smaller pipe.

20 Claims, 2 Drawing Sheets

ELECTRICAL PIPELINE REMEDIATION

CROSS-REFERENCE TO RELATED APPLICATIONS:N/A

STATEMENT REGARDING FEDERALLY SPONSORED RESEARCH OR DEVELOPMENT:N/A

INCORPORATION-BY-REFERENCE OF MATERIAL SUBMITTED ON A COMPACT DISK:N/A

BACKGROUND OF THE INVENTION

The field of this invention is that of tools used for the cleaning of pipelines, especially the long extended reach pipelines in offshore areas. As gases are produced in deep offshore wells and flow along pipelines, they may combine with water within the gas stream at certain combinations of temperature and pressure to form hydrate blockages. The hydrates are similar to crushed ice packed within the pipeline.

Once formed, the hydrate blockages can take weeks or months to disassociate or melt, with the production stream thru the pipeline being completely blocked. The most common means to remove the blockage is to reduce the pressure on the accessible side of the blockage to a lower pressure which allows it to melt. When this happens, the higher pressure gas on the other side of the blockage will tend to expand as it moves through the porosity of the blockage. This gas expansion provides a cooling which prolongs the life of the hydrate. This process can take weeks or months.

A second method for removing the hydrate blockage is to place a coiled tubing within the pipeline to circulate liquids to dissolve the hydrate directly. In shorter pipelines the coiled tubing can be simply pushed out into the pipeline. In longer ones, a rubber cup "pig" is placed on the end of the pipeline to pull the coiled tubing out to the location.

A potential problem can occur with this method. If the liquids are circulated out to the blockage through the annular area between the outside diameter of the coiled tubing and the inside diameter of the pipeline and then return within the internal diameter of the coiled tubing, the internal diameter of the coiled tubing can become blocked. The hydrates may reform within the bore of the coiled tubing and make the coiled tubing and associated pig difficult to retrieve from the pipeline, much less removing the pipeline blockage.

A similar situation may occur if paraffins are formed within the internal diameter of the pipeline and are removed through the internal bore of the coiled tubing.

BRIEF SUMMARY OF THE INVENTION

The object of this invention is to provide a method for removing hydrate buildup within the bore of a coiled tubing string within a pipeline or other pipe string.

A second object of the present invention is to provide a method for preventing a buildup of hydrates within the bore of a coiled tubing string within a pipeline or other pipe string.

A third object of the present invention is to a method for removing wax or paraffin buildup within the bore of a coiled tubing string within a pipeline or other pipe string.

Another object of the present invention is to provide a method for preventing a buildup of waxes or paraffins within the bore of a coiled tubing string inside a pipeline or other pipe string.

BRIEF DESCRIPTION OF SEVERAL VIEWS OF THE DRAWINGS

FIG. no. 1 is a half section of the present invention showing the circulation path in the annular area between the internal bore of the pipeline and the outer diameter of the coiled tubing and back up the internal bore of the coiled tubing.

FIG. no. 2 is a half section of the present invention showing that a blockage has been formed within the bore of the coiled tubing.

DETAILED DESCRIPTION OF THE INVENTION

Figure 1:
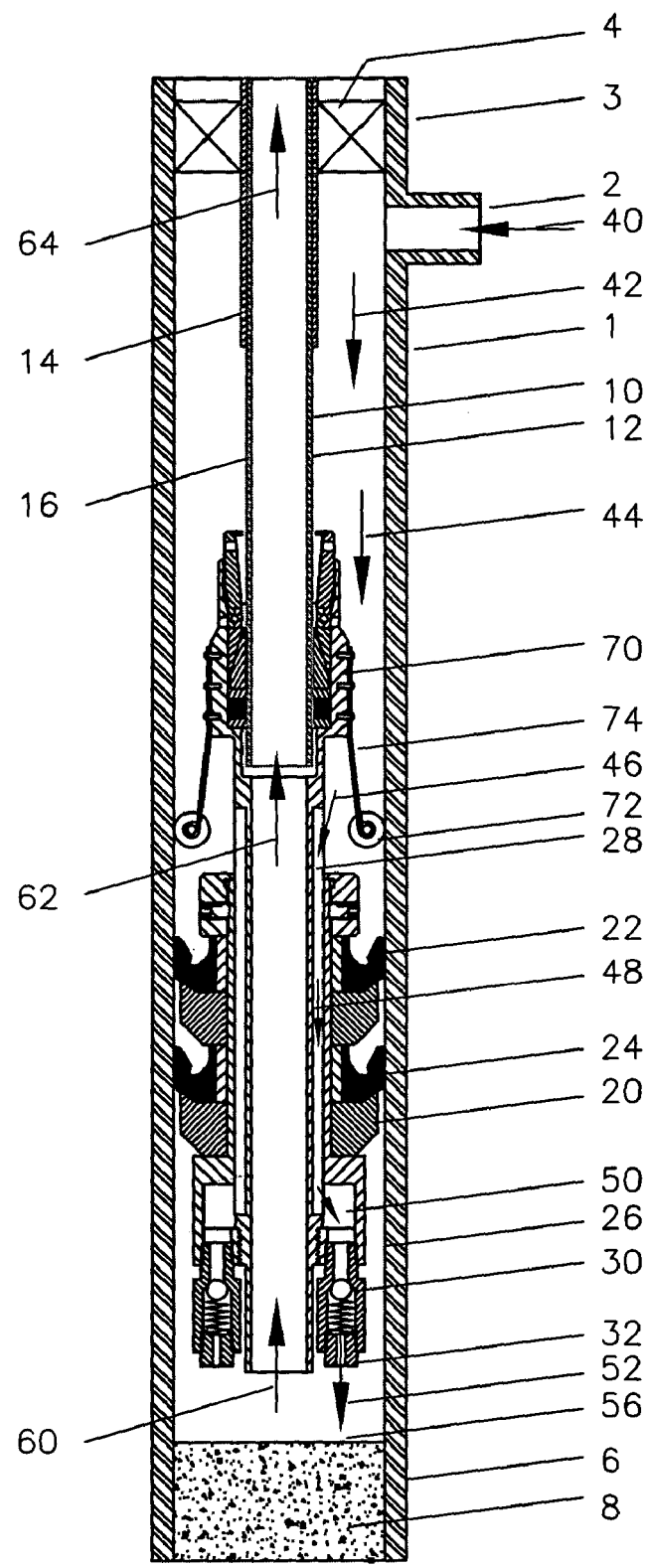
Figure 2:
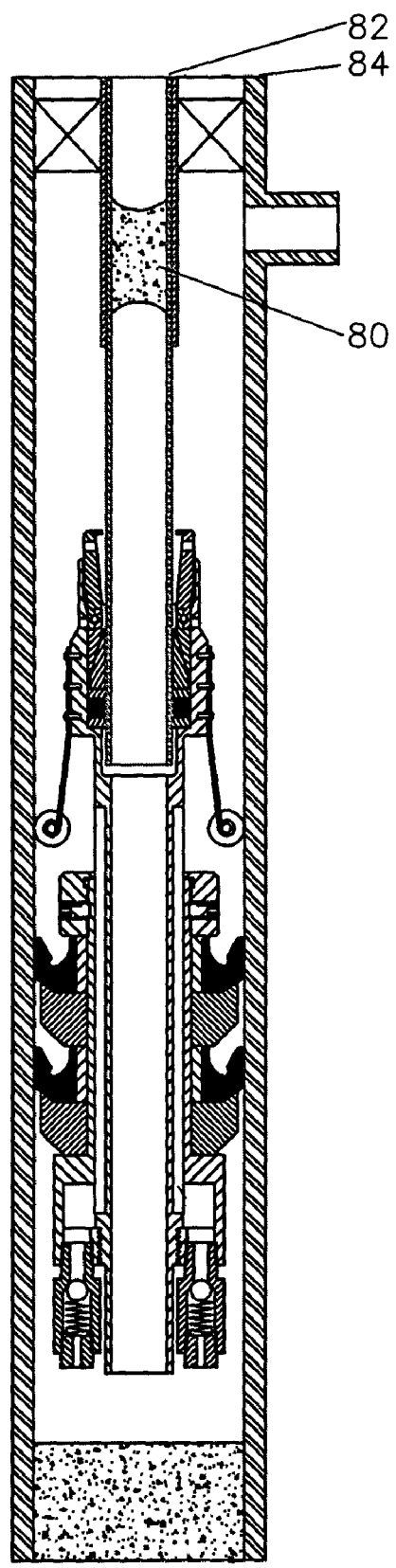

FIG. 1 shows a pipeline 1 having an inlet 2, a proximate end 3, a sealing packer 4, a distal end 6, and a blockage 8.

A coiled tubing string 10 is shown passing through the sealing packer 4 and extending to a distal end 12. The coiled tubing 10 has an electrically insulating coating 14 over much of its length and distal end 12 has a portion 16 which has had the electrically insulating coating removed.

Pig 20 has sealing cups 22 and 24 which engage the internal bore 26 of pipeline 1. Internal passage 28 communicates from one end of the pig 20 to the other end thru a check valve 30 and a jetting nozzle 32.

Flow enters the pipeline inlet 2 at 40, flows down 42, 44, 46, 48, 50, and 52 thru the jetting nozzles 32 and impacts the blockage 8 at 56. The flow and portions of the blockage 8 pass back to the proximate end of the flowline along arrows 60, 62, and 64.

Slip and seal assembly 70 engages the bare end 16 of the coiled tubing 10 and provides for the attachment of the pig 20 to the coiled tubing 10. Contacts 72 electrically engage the internal bore 26 of the pipeline and are urged to remain in contact by the resilient members 74.

Referring now to figure no. 2, a portion of blockage 8 has reformed within the coiled tubing string 10 at 80, blocking the flow and preventing the coiled tubing and pig from being pulled from the pipeline 1.

At this time, electrical contacts are attached at 82 and 84 to pass an electrical current from contact 82 along the coiled tubing 10, thru the slip and seal assembly 70, thru the contacts 72, and back along the pipeline 1 to contact 84. As all steels have an electrical resistance, the current generates heat. The heat will increase the temperature of the hydrate or paraffin and cause it to melt. Once the hydrate or paraffin is melted, the flow can be reestablished.

Alternately, as the addition of electrically induced heat will remove the hydrate or paraffin blockage after it is formed, operations can be beneficially assisted by adding the electrically induced heat to prevent the formation of the blockage in the first place.

The application of the coating 14 provides the electrical insulation necessary to allow the metal coiled tubing to pass down the bore of the metal pipeline without shorting out. Additionally, the insulation properties of the coating will enhance the ability to melt the hydrate or paraffin blockage.

The particular embodiments disclosed above are illustrative only, as the invention may be modified and practiced in different but equivalent manners apparent to those skilled in the art having the benefit of the teachings herein. Further-more, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of remediating deposits within a pipeline comprising
    inserting a removable pipe within said pipeline,
    providing an electrically insulating coating on said removeable pipe,
    providing a contactor proximate the distal end of said removeable pipe to electrically contact the internal diameter of said pipeline,
    flowing an electrical current along the wall area of said removeable pipe, through said contactor, and along the wall area of said pipeline to generate heat within said removeable pipe to remediate blockages within said removeable pipe.

2. The invention of claim 1, further comprising
    providing one or more seals on said removeable pipe proximate the distal end of said removeable pipe to sealingly engage the internal diameter of said pipeline to pull said removeable pipe into said pipeline.

3. The method of claim 1, wherein said contactor is one or more wheels.

4. The method of claim 1 wherein said electrical current is direct current.

5. The method of claim 1 wherein said electrical current is alternating current.

6. The method of claim 2, wherein said contactor is one or more wheels.

7. The method of claim 2 wherein said electrical current is direct current.

8. The method of claim 2 wherein said electrical current is alternating current.

9. A method of remediating deposits within a pipeline comprising
    inserting a removable pipe within said pipeline,
    providing an electrically insulating coating on said removeable pipe,
    providing a contactor proximate said distal end of said removeable pipe to electrically contact said internal diameter of said pipeline,
    flowing an electrical current along the wall area of said removeable pipe, through said contactor, and along the wall area of said pipeline to generate heat within said removeable pipe to heat the liquids within said removeable pipe, and
    flowing said heated liquids out the distal end of said removeable pipe and onto said deposits within said pipeline.

10. The invention of claim 9, further comprising providing one or more seals on said removeable pipe proximate the distal end of said removeable pipe to sealingly engage the internal diameter of said pipeline to pull said removeable pipe into said pipeline.

11. The method of claim 9, wherein said contactor is one or more wheels.

12. The method of claim 9 wherein said electrical current is direct current.

13. The method of claim 9 wherein said electrical current is alternating current.

14. The method of claim 10, wherein said contactor is one or more wheels.

15. The method of claim 10 wherein said electrical current is direct current.

16. The method of claim 10 wherein said electrical current is alternating current.

17. A method of preventing deposits within a first pipe comprising
    inserting a removable pipe within said first pipe,
    providing an electrically insulating coating on said removeable pipe,
    providing a contactor proximate said distal end of said removeable pipe to electrically contact said internal diameter of said first pipe,
    flowing an electrical current along the wall area of said removeable pipe, through said contactor, and along the wall area of said first pipe to generate heat within said removeable pipe to elevate the temperature of the liquids within said removeable pipe and prevent paraffin from forming on the internal bore of said removeable pipe.

18. The invention of claim 17, further comprising
    providing one or more seals on said removeable pipe proximate the distal end of said removeable pipe to sealingly engage the internal diameter of said first pipe to pull said removeable pipe into said first pipe.

19. The method of claim 17, wherein said contactor is one or more wheels.

20. The method of claim 18, wherein said contactor is one or more wheels.

* * * * *